US00RE41224E

(19) United States
(12) Reissued Patent
Kubota et al.

(10) Patent Number: US RE41,224 E
(45) Date of Reissued Patent: Apr. 13, 2010

(54) CONNECTOR

(75) Inventors: Yoshifumi Kubota, Tokyo (JP); Yoshihide Kuroki, Tachikawa (JP); Masahide Watanabe, Akiruno-shi (JP)

(73) Assignee: Japan Aviation Electronics Industry, Limited, Tokyo (JP)

(21) Appl. No.: 11/334,820

(22) Filed: Jan. 18, 2006

Related U.S. Patent Documents

Reissue of:
(64) Patent No.: 6,776,660
Issued: Aug. 17, 2004
Appl. No.: 10/426,218
Filed: Apr. 30, 2002

(51) Int. Cl.
*H01R 13/648* (2006.01)

(52) U.S. Cl. ..... 439/609; 439/680
(58) Field of Classification Search ..... 439/680, 439/681, 677, 607, 609, 610
See application file for complete search history.

(56) References Cited

U.S. PATENT DOCUMENTS

| | | | | |
|---|---|---|---|---|
| 4,508,756 | A | | 4/1985 | Senda et al. |
| 4,567,608 | A | | 1/1986 | Watson et al. |
| 4,850,899 | A | * | 7/1989 | Maynard |
| 5,055,069 | A | * | 10/1991 | Townsend et al. |
| 5,080,603 | A | * | 1/1992 | Mouissie |
| 5,104,243 | A | * | 4/1992 | Harding |
| 5,108,313 | A | * | 4/1992 | Adams |
| 5,186,646 | A | * | 2/1993 | Pederson |
| 5,235,217 | A | | 8/1993 | Kirton |
| 5,267,881 | A | | 12/1993 | Matuzaki |
| 5,277,624 | A | * | 1/1994 | Champion |
| 5,344,335 | A | | 9/1994 | Scholz et al. |

(Continued)

FOREIGN PATENT DOCUMENTS

| | | | |
|---|---|---|---|
| CN | 1282124 | A | 1/2001 |
| CN | 1368768 | A | 9/2002 |
| DE | 10104288 | C1 | 4/2002 |
| EP | 0805523 | A2 | 11/1997 |
| JP | 7-176351 | A | 7/1995 |
| JP | 10-321302 | A | 12/1998 |
| JP | 10-334993 | A | 12/1998 |
| JP | 2000-223216 | A | 6/2000 |
| JP | 2000-223215 | A | 8/2000 |
| JP | 2000-223218 | A | 8/2000 |
| JP | 2001-35603 | A | 2/2001 |
| JP | 2001-196133 | A | 7/2001 |
| JP | 2001-230021 | A | 8/2001 |
| WO | WO 97/39610 | A | 10/1997 |

OTHER PUBLICATIONS

Derman, Glenda, "Monitors Make Net Connections", 1996, *Electronic Engineering Times*, vol. 933, pp. 60 and 69.
Lewis, Peter; "On Technology"; 2002, *Fortune Magazine*, p. 240.
"iPodDock/iPod Cradle"; www.bookendz/dock_cradle.htm, downloaded Feb. 27, 2003, 2 pages.
"Neuros MP3 Digital Audio Computer"; www.neurosaudio.com. downloaded Apr. 9, 2003, 6 pages.

*Primary Examiner*—Ross N Gushi
(74) *Attorney, Agent, or Firm*—Townsend and Townsend and Crew LLP

(57) ABSTRACT

A connector including a first connector element and a second connector element that are coupled into a single unit, in which the first connector element has an engagement projection that projects interior of the first connector element and extends in the direction of the depth of the first connector element so that the front end of the engagement projection is spacedly apart from the front edge of the first connector element, and the second connector element is formed with an engagement slit that extends in the direction of depth of the second connector element and engages with the engagement projection of the first connector element.

10 Claims, 6 Drawing Sheets

U.S. PATENT DOCUMENTS 5,425,650 A 6/1995 Maeda
5,586,893 A * 12/1996 Mosquera
5,660,558 A * 8/1997 Osanai et al.
5,697,817 A 12/1997 Bouchan et al.
5,830,001 A * 11/1998 Kinoshita
5,901,049 A * 5/1999 Schmidt et al.
5,975,957 A * 11/1999 Noda et al.
5,990,758 A 11/1999 Matsubara
6,053,773 A * 4/2000 Wu
6,116,943 A 9/2000 Ferrill et al.
6,154,798 A * 11/2000 Lin et al.
6,203,345 B1 * 3/2001 Roque et al.
6,206,480 B1 * 3/2001 Thompson
6,267,623 B1 * 7/2001 Hisamatsu
6,319,061 B1 * 11/2001 Chen et al.
6,322,396 B1 * 11/2001 Kuan
6,344,727 B1 * 2/2002 Desai et al.
6,354,713 B1 * 3/2002 Leifer et al.
6,356,084 B1 3/2002 Levine
6,358,089 B1 * 3/2002 Kuroda et al. ..... 439/607
6,431,915 B1 * 8/2002 Ko
6,454,592 B2 * 9/2002 Takagi
6,461,173 B1 * 10/2002 Mizuno et al.
6,464,542 B1 * 10/2002 Lee
6,468,110 B2 10/2002 Fujino et al.
6,478,603 B1 11/2002 Wu
6,485,328 B1 11/2002 Wu
6,524,119 B2 2/2003 Kato et al.
6,577,877 B1 6/2003 Charlier et al.
6,585,540 B2 7/2003 Guitierrez et al.
6,591,085 B1 7/2003 Grady
6,607,397 B1 * 8/2003 Zhang et al. ..... 439/357
6,608,264 B1 8/2003 Fouladpour
6,616,473 B2 9/2003 Kamata et al.
6,619,986 B1 * 9/2003 Yeh ..... 439/607
6,653,813 B2 11/2003 Khatri
6,728,546 B1 4/2004 Peterson et al.
6,776,626 B2 8/2004 Huang et al.
6,776,665 B2 8/2004 Huang
6,813,528 B1 11/2004 Yang
6,816,376 B2 11/2004 Bright et al.
6,840,807 B2 * 1/2005 Ooya et al. ..... 439/630
6,859,854 B2 2/2005 Kwong
6,991,483 B1 1/2006 Milan et al.
7,004,787 B2 2/2006 Milan
2002/0010759 A1 * 1/2002 Hitson et al.
2002/0029303 A1 * 3/2002 Nguyen
2002/0065074 A1 * 5/2002 Cohn et al.
2002/0103008 A1 * 8/2002 Rahn et al.
2002/0115480 A1 * 8/2002 Haung
2002/0151327 A1 * 10/2002 Levitt
2002/0156546 A1 * 10/2002 Ramaswamy
2003/0002866 A1 1/2003 Tan et al.
2003/0008553 A1 * 1/2003 Oleynick et al. ..... 439/541.5
2003/0067741 A1 4/2003 Alfonso et al.
2003/0073432 A1 4/2003 Meade
2004/0090998 A1 5/2004 Chen
2004/0186935 A1 9/2004 Bell et al.
2004/0224638 A1 11/2004 Fadell
2004/0235339 A1 11/2004 Sato et al.
2005/0014536 A1 1/2005 Grady
2005/0227537 A1 10/2005 Peng
2005/0239333 A1 10/2005 Watanabe et al.
2006/0001700 A1 1/2006 Bertelsen
2006/0160429 A1 7/2006 Dawiedczyk et al.
2006/0292354 A1 12/2006 Miyashita

* cited by examiner

FIG. 4 (Amended)
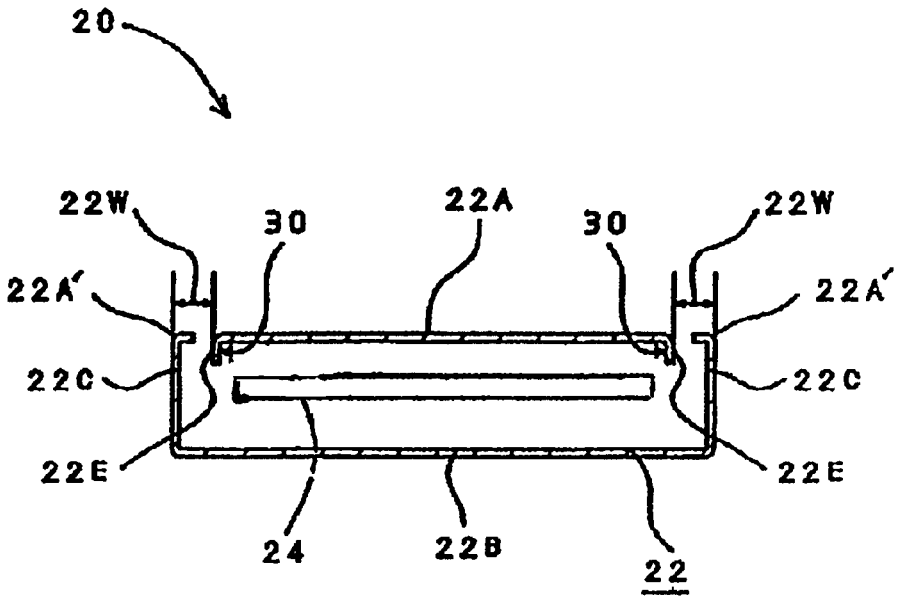

FIG. 7 (Amended)
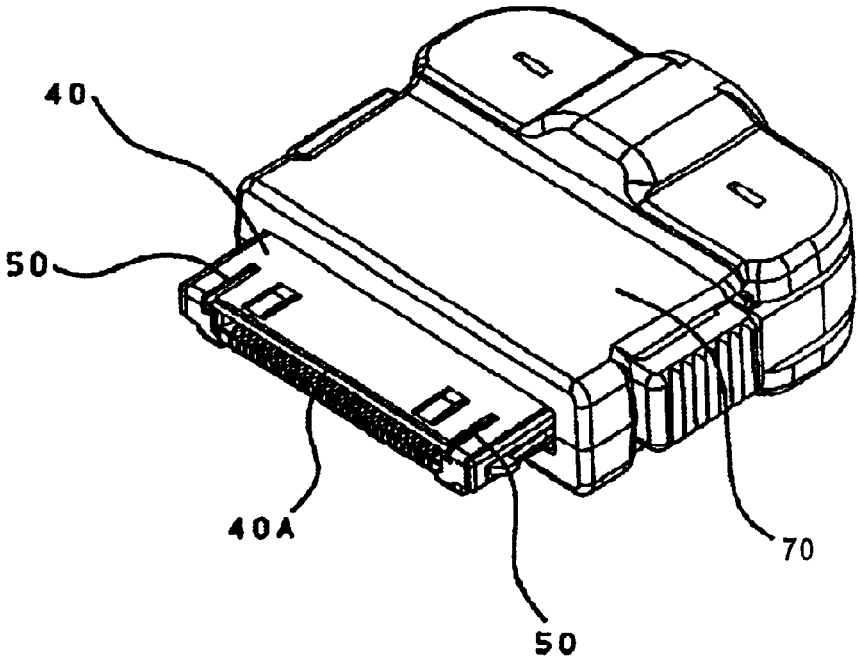
FIG. 9 (Amended)
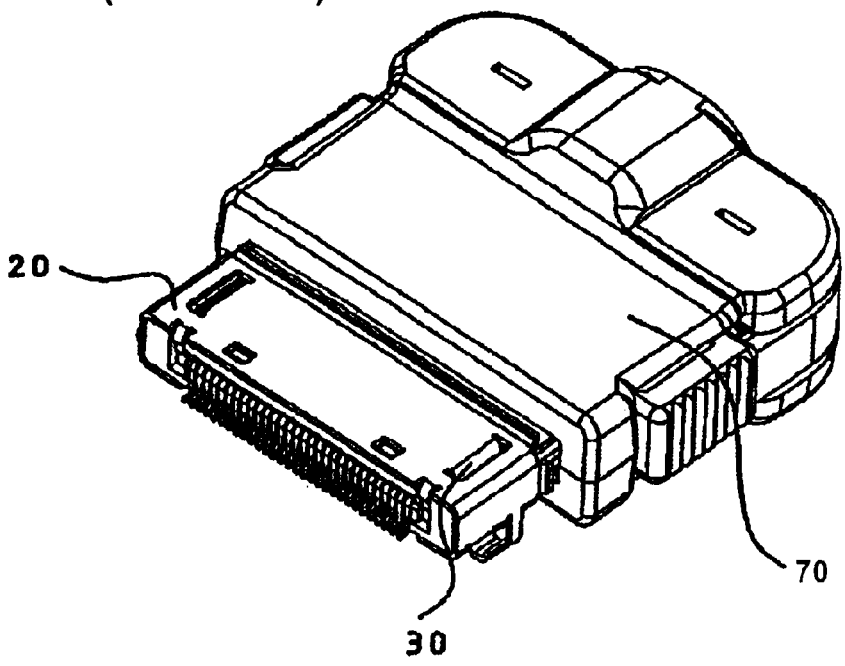

CONNECTOR

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6.776,660. The reissue applications are application Ser. Nos. 11/334,820 (present application), 29/318,045, 12/613,474, and 12/613,482 all of which are continuation reissues of 11/334,820.*

BACKGROUND OF THE INVENTION

1. Field of the Invention

The present invention relates to a connector and more particularly to an electrical connector used in, for instance, small size electrical appliances.

2. Prior Art

In for instance, computer related electronic appliances, the electrical connections including connections to an AC adapter, to interfaces, etc. are made in many different ways. Such electrical connections are typically made by connectors that substantially comprise a receptacle (female) side connector element and a plug (male) side connector element that is brought into the receptacle side connector and coupled thereto for making electrical connection in between so that pin-shaped electrodes installed in the connector elements are connected.

More specifically, connectors typically include in their metal shells a plurality of pins (or terminals) that are arranged in parallel in their longitudinal directions and positionally secured by insulator material such as polyamide, LCP (liquid crystallization polymer), etc. The pins in the receptacle and plug side connector elements are spacedly arranged side by side in the direction in which the connector elements are made together.

Upon making connection of the plug side connector element into the receptacle side connector element, it is necessary that responsive pins in two connector elements be aligned to be on a straight line. In other words, it is necessary to avoid the connector elements from being oblique to each other when they are brought together at their front edges for connection. If the plug side connector element in an oblique posture with reference to the receptacle side connector element, as shown in FIG. 10, is pushed into the receptacle side connector element, an irregular pin connection is made (as at 100) as seen from the enlarged view shown in the circle in FIG. 10, and this would cause several problems including short-circuiting.

In addition, when the plug side connector element is connected to the receptacle connector element in a slanted posture (which can easily occur when there is size differences between the receptacle and plug side connector elements), removing of the plug side connector element from the receptacle side connector element is not easily done and occasionally requires forcibly and repeated twists on the shell of the plug side connector element. This would cause damage to the pins and the shells of both connector elements.

Thus, though pin alignment is essential when connection is made between the two connector elements, such a pin alignment is not obtained easily and this difficulty can occur often when the connector is small in size and used in small size electrical devices such as a personal digital assistance (PDA), digital cameras, camcorders, etc.

SUMMARY OF THE INVENTION

Accordingly, the object of the present invention is to provide an electrical connector that allows accurate and secure connections or coupling between connector elements to be made easily without causing pin or electrode misalignment.

The above object is accomplished by a unique structure of the present invention for a connector that comprise a first connector element and a second connector element that are coupled together when the second connector element is fitted in the first connector element, and in the present invention:

the first connector element is formed with an engagement projection that extends in the direction of the depth of the first connector element, the front end of the engagement projection being spacedly apart from the front edge of the first connector element; and the second connector element is formed with an engagement slit or slot that extends in the direction of the depth of the second connector element so that the engagement slit receives therein the engagement projection of first connector element when the first and second connector elements are connected.

With the structure above, upon connecting the second connector element to the first connector element, the front end of the engagement slit of the second connector element engages with the engagement projection of the first connecting element after the front end of the engagement slit has advanced the distance between the front edge of the first connector element and the front end of the engagement projection, and then the second connector element is pushed all the way to back of the first connector element in the depth of the first connector element while being guided by the engagement slit engaging with the engagement projection. Accordingly, even when the second connector element is obliquely pushed into the first connector element at the initial stage of coupling process, such oblique posture is corrected by the engagement projection of the first connector element as the second connector element is pushed and advanced to the back of the first connector element, and a connection between the first and second connector elements with the pins (electrodes) inside both of them being adapted straight can be made assuredly.

BRIEF DESCRIPTION OF THE DRAWINGS

FIG. 4 schematically shows the cross section of the first connector body taken along the line 44 in FIG. 3;

FIG. 7 illustrates the second connector body which is combined with a plug assembly, FIG. 9 illustrates the first connector body to which the second connector body (not seen) is connected.

DETAILED DESCRIPTION OF THE INVENTION

The connector of the present invention is comprised of a first connector body 20 (a receptacle side connector element) and a second connector body 40 (a plug side connector element).

Figure 1:
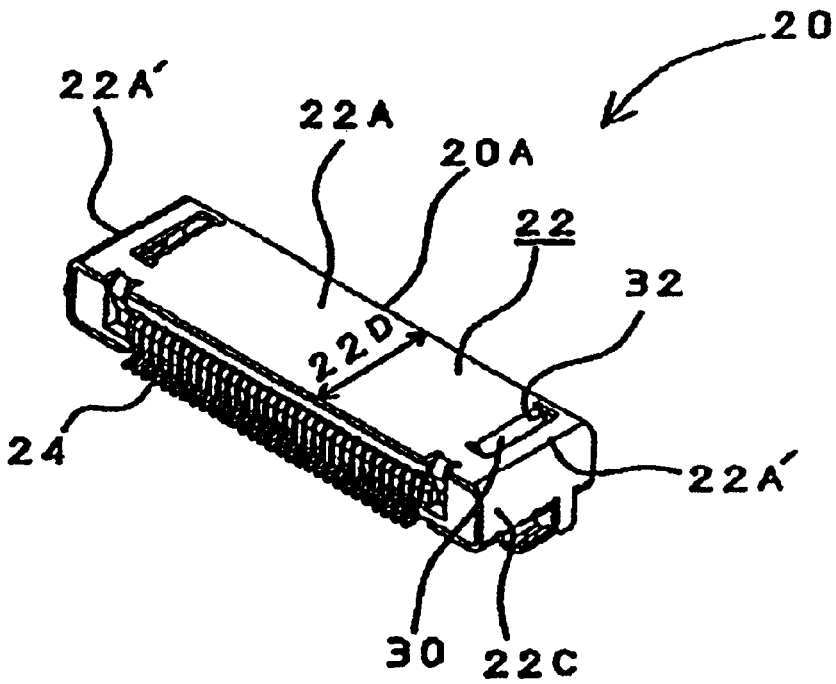
FIG. 1 is a perspective view of the first connector body (first connector element) of the connector according to the present invention.
Figure 2:
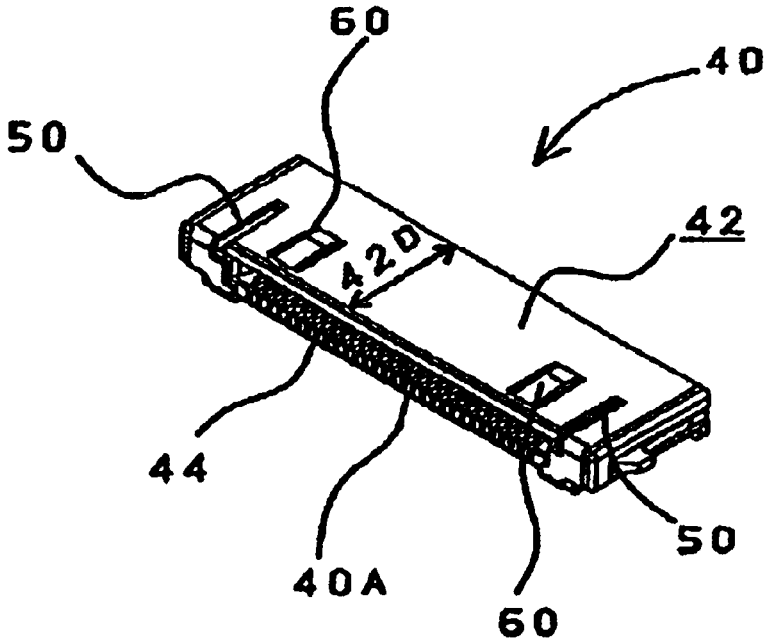
FIG. 2 is a perspective view of the second connector body (second connector element) of the connector according to the present invention.

As seen from FIGS. 1 and 2, the first and second connector bodies 20 and 40 comprise respectively a relatively flat box shape shell 22 and 42 made of a metal and include therein a plurality of pins or elongated electrodes, which are collectively referred to by the reference numerals 24 and 44 respectively, and an insulating material (not shown) is filled therein so as to positionally secure the pins 24 and 44.

Figure 3:
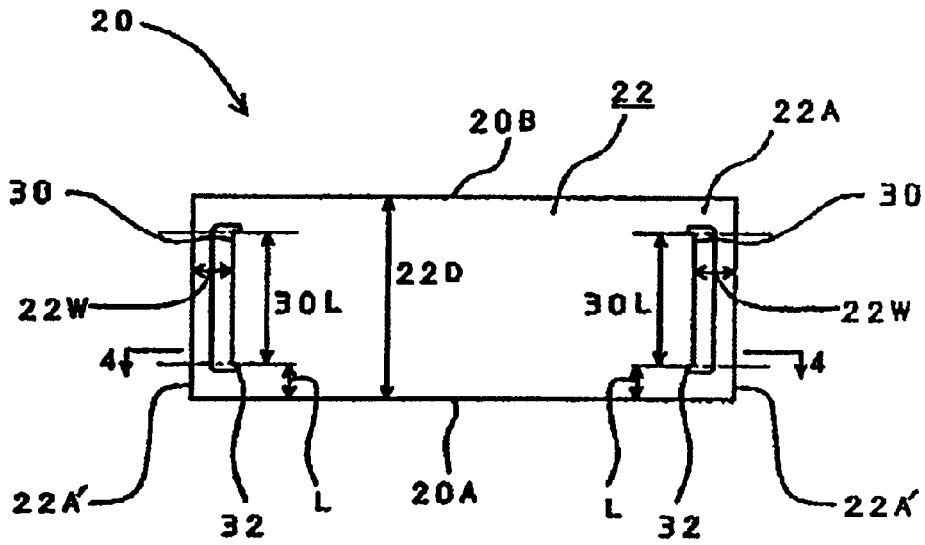
FIG. 3 is a schematic top view of the first connector body.
Figure 5:
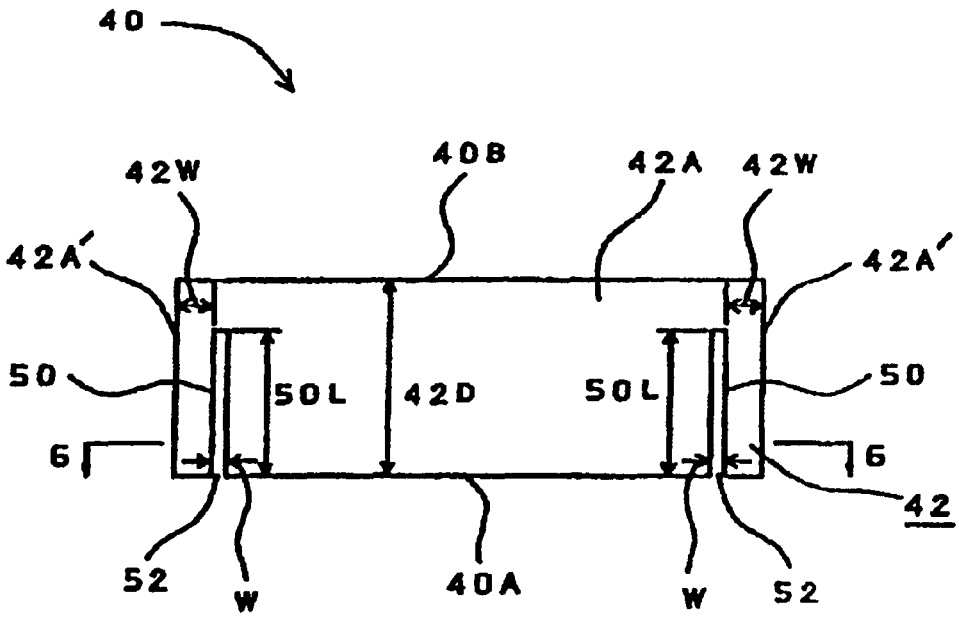
FIG. 5 is a schematic top view of the second connector body.

The shell 22 of the first connector body 20 comprises, as best seen from FIG. 4, a top shell plate 22A and a bottom shell plate 22B as well as side shell plates 22C, thus forming a box shape that has a predetermined depth 22D (see FIG. 3) that extends from the front edge 20A to the rear edge 20B of the first connector body 20. The pins 24 of the first connector body 20 are arranged parallel to the direction of the depth 22D.

The shell 22 of the first connector 20 is formed in its top shell plate 22A with engagement projections 30. Each of the projections 30 is formed by cutting the top shell plate 22A in an angled C shape, and the resulting tongue pieces 22E are bent inward toward the interior of the shell 22. The tongue pieces 22E are in the shape of elongated parts of the shell 22 that extend in the direction of the depth 22D of the first connector body 20, and they are parallel to the side shell plates 22C of the first connector body 20 or to the side edges 22A' of the top shell plate 22A.

The tongue pieces 22E are bent at locations of distance 22W from the side shell plates 22C or from the side edges 22A' of the first connector body 20 to make the engagement projections 30. The engagement projections 30 are provided with a space of a distance L apart from the front edge 20A of the first connector body 20. In other words, the front ends 32 of the engagement projections 32 are spaced apart from the front edge 20A of the first connector body 20. The engagement projections 30 have a length 30L which is, in the shown embodiment, about two third the depth 22D of the first connector body 20.

Figure 6:
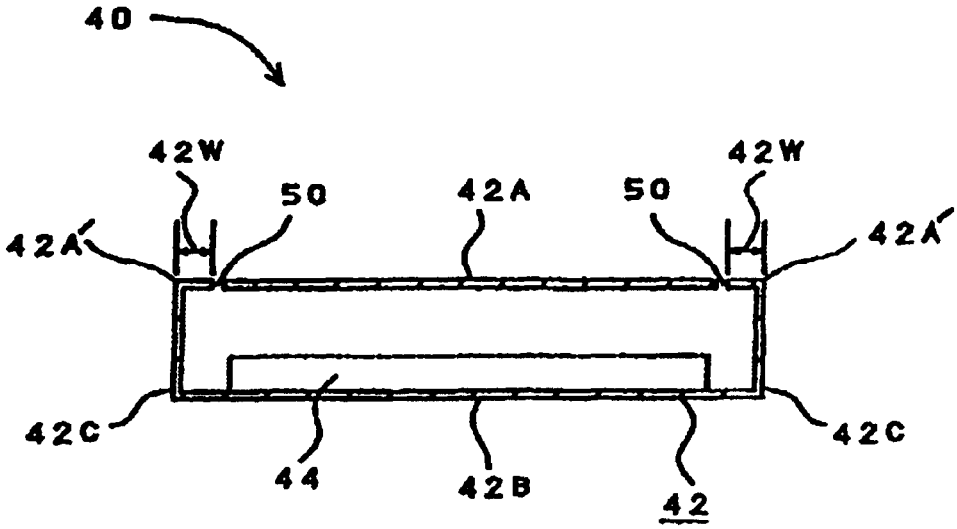
FIG. 6 schematically shows the cross section of the second connector body taken along line 6—6 in FIG. 5.

On the other hand, the shell 42 of the second connector body 40 comprises, as best seen from FIG. 6, a top shell plate 42A and a bottom [shall] *shell* plate 42B as well as side shell plates 42C, thus forming a box shape with a predetermined depth 42D (see FIG. 6) that extends from the front edge 40A to the rear edge 40B of the second connector body 40. The overall size of the shell 42 of the second connector 42 is slightly smaller than the shell 22 of the first connector body 20 so that the second connector body 40 is fitted in the first connector body 20 from the first side of the first connector body 20. The pins 44 of the second connector body 40 are arranged so be parallel to the direction of the depth 42D.

The shell 42 of the second connector body 40 is formed in its top shell plate 42A with engagement slits 50. Each of the engagement slits 50 is formed by cutting away parts of the top shell plate 42A linearly so that the engagement slits 50 are parallel to and adjacent to the side plates 42C or to side edges 42A' of the top shell plate 42A. An alternate construction would be to mold the slits 50 into the shell 42 when the shell 42 is made. The engagement slits 50 are provided so as to extend in the direction of depth 42D of the shell 42 of the second connector body 40. In other words, the front end ends 52 of the engagement slits 50 are on the front edge 40A of the second connector body 40. The engagement slits 50 have a length 50L which is, in the shown embodiment, about two thirds of the depth 42D of the second connector body 40 and is slightly larger in length than the engagement projections 30 of the first connector body 20.

The engagement slits 50 are opened at locations of distance 42W from the side shell plates 42C or from the side edges 42A' of the top shell plate 42A of the second connector body 40, the distance 42W being substantially the same as the distance 22W of the engagement projections 30 of the first connector body 20. Thus, the engagement slits 50 positionally correspond to the engagement projections 30 of the first connector body 20. The width W of the engagement slits 50 is substantially the same as (or slightly larger than) the thickness of the tongue pieces 22E (engagement projections 30) which is the thickness of the metal material of the shell 22 of the first connector body 20.

The reference numerals 60 shown in FIG. 2 are raised springy holders formed by notching the top shell plate 42A of the second connector body 40 and raised outwardly.

The first and second connector bodies 20 and 40 structured as described above are connected by way of mating together at the front ends of the shells 22 and 42.

More specifically, as shown in FIG. 7, the second connector body 40, which is attached at its rear edge 40B to, typically, a plug assembly 60 that is connected to, for instance, an electrical cable (not shown), is held by hand, and then is brought to the vicinity of the first connector body 20 which is installed in a casing body of, for instance, a PDA (not shown).

The front edge 40A of the second connector body 40, which is a plug side connector element, is set so as to face the front edge 20A of the first connector body 20, which is a receptacle side connector element, so that the first and second connector bodies 20 and 40 are aligned in the direction of the depth thereof (which brings an alignment of the pins 24 and 44 installed in such connector bodies 20 and 40). In this positioning, since the distances 22W and 42W of the first and second connector bodies 20 and 40 are substantially equal, the engagement projections 30 of the first connector body 20 and the engagement slits 50 of the second connector body 40 are also aligned on imaginary straight lines.

Figure 8:
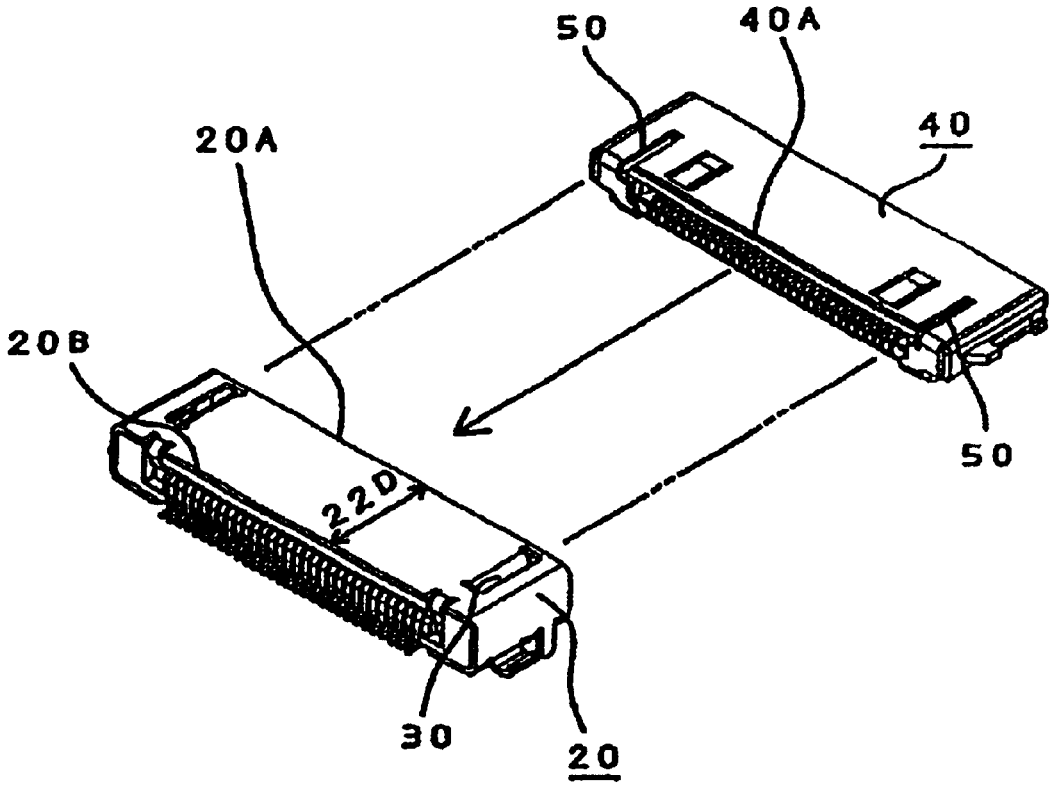
FIG. 8 illustrates the manner of connecting the second connector body to the first connector body.
Figure 10:
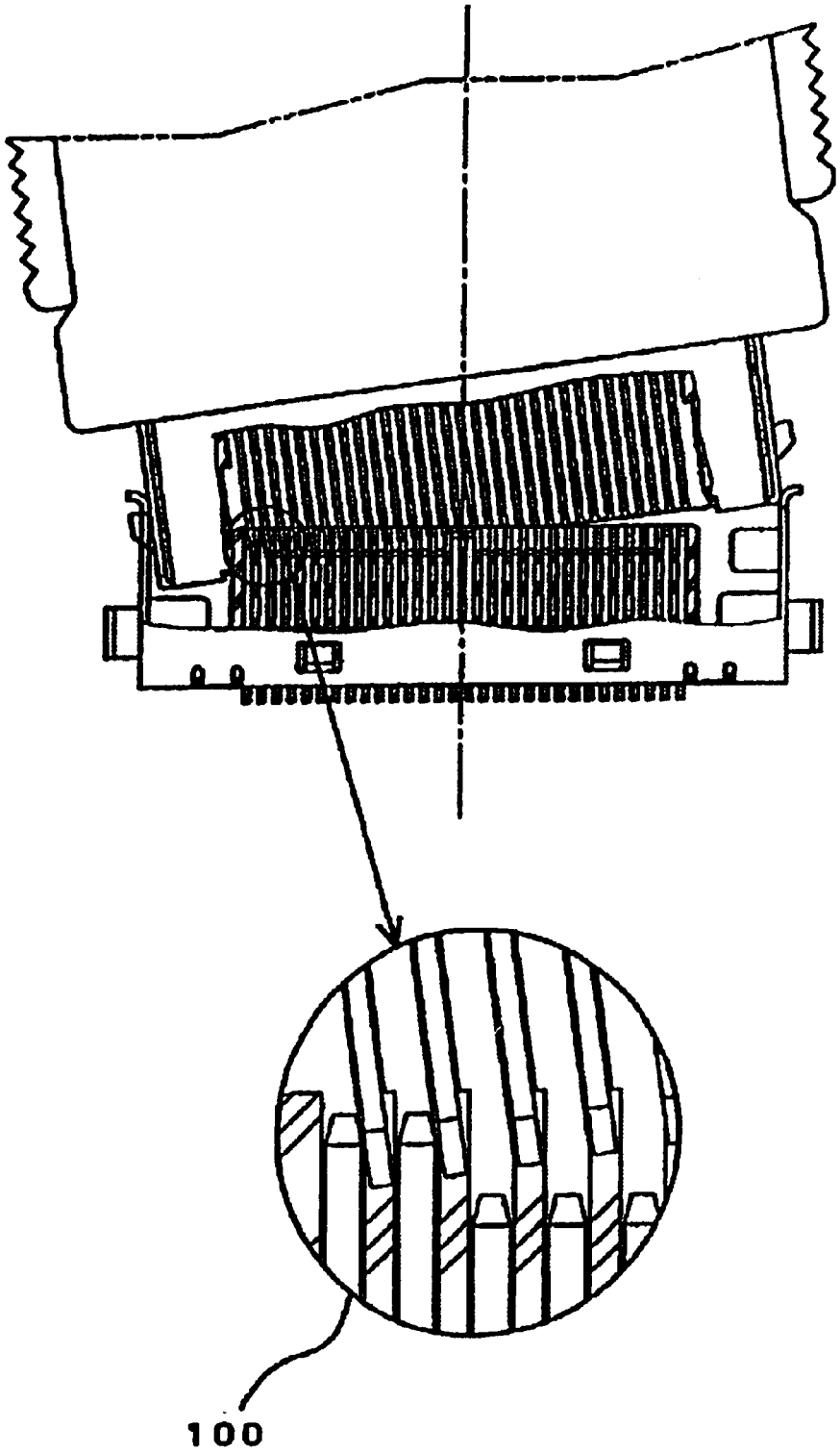
FIG. 10 PRIOR ART
FIG. 10 illustrates the manner of oblique connection of the first and second connector elements in prior art connector.

Then, the second connector body 40 is pushed into the first connector body 20 as shown by arrow in FIG. 8. During the initial pushing movement, the outer surfaces of the shell 42 of the second connector body 40 are guided by the inner surfaces of the shells 22 of the first connector 20. After advancing the distance L which is the distance from the front edge 20A to the front ends 32 of the engagement projections 30 in the first connector body 20, the engagement slits 50 of the second connector body 40 come into engagement with the engagement projections 30 of the first connector body 20. As a result, the sliding movement of the second connector body 40 in the depth 22D of and toward the rear edge 20B of the first connector body 20 is guided by the engagement projections 30. The second connector body 40 is thus pushed into the first connector body 20 straight with the pins inside both connector bodies aligned straight as well and connected to the first connector body 20 (see FIG. 9, in which the second connector body 40 is unseen since it is inside the first connector body 20). The second connector body 40 is held inside the first connector body 20 by the raised springy holders 60 that press against the inside surface of the top shell plate 22A of the first connector body 20.

The width W of each engagement slit 50 is substantially the same as (or slightly larger than) the thickness of the engagement projection 30, and thus the engagement projections 30 have substantially no space for play in the direction perpendicular to the direction of the length of the engagement slits 50 or to the direction of the connecting direction of the first and second connector bodies 20 and 40. Accordingly, the engagement slits 50 of the second connector body 40 make no lateral movements during the sliding movement, keeping the straight alignment obtained by the engaged engagement projections 30 and engagement slits 50.

As a result, even when the second connector body 40 is slanted with reference to the first connector body 20 during the initial connecting stage, such a slanted positional relationship is automatically corrected to a straight relationship as the second connector body 40 is pushed into deep in the first connector body 20, and a snug and secure engagement of the first and second connector bodies 20 and 40 is accomplished, and pins 24 and 44 of the first and second connector bodies 20 and 40 are connected properly. The engagement projections 30 and the engagement slits 50 are formed near the side edges 22A' and 42A' of the first and second connector bodies 20 and 40, respectively; accordingly, the connection of the connector bodies 20 and 40 can be made in a stable fashion, and a separation of the connected connecting bodies can be made easily.

What is claimed is:

1. A connector comprising a first connector element and a second connector element that are coupled together, wherein said first and second connector elements are each formed with a metallic shell;

said first connector element is formed with an engagement projection that projects toward an interior of said first connector element and extends in a direction of depth of said first connector element, a front end of said engagement projection being spaced apart from a front edge of said connector element by a predetermined distance;

said engagement projection is formed by cutting a C-shape slit in a top surface of said metallic shell of said first connector element and bending a tongue formed downwardly, *an engagement edge of the tongue extending by a first length in the direction of depth of said first connector element*; and said second connector element is formed with an *elongated* engagement slit in said metallic shell *the elongated engagement slit having a second length* that *starts at a front edge of the metallic shell of the second connector element and* extends in a direction of depth of said metallic shell of said second connector for engaging with said engagement projection formed in said metallic shell of said first connector element,

*wherein, the engagement projection and the elongated engagement slit are configured such that when pushing the second connector element into the first connector element, the engagement edge of the tongue of the engagement projection engages the elongated engagement slit at the front edge of the metallic shell of the second connector element to provide for straight alignment, and wherein, the first length of the engagement edge of the tongue slides along the second length of the elongated slit to guide the sliding movement as the second connector element is pushed in the direction of depth and toward a rear of the first connector element.*

2. The connector according to claim 1, wherein said engagement projection is provided at two locations of said first connector element so as to be parallel to side edges of said first connector element, and said *elongated* engagement slit is provided at two locations of said second connector element so as to be parallel to side edges of said second connector element and to correspond to said two locations of said engagement projections of said first connector element.

3. The connector according to claim 1, wherein said engagement projection has a predetermined length in said depth direction and said *elongated* engagement slit has a predetermined length in said depth direction which is at said predetermined length of said engagement projection.

*4. An electrical connector system comprising:*

*a first electrical connector including:*

*a body having a metallic top plate, a metallic bottom plate, a first side and a second side, the body having a width W1 and a depth D1, wherein the first and second sides are smaller relative to the top and bottom plates providing a substantially flat body;*

*an array of electrodes extending in the direction of the depth D1 inside the body; and*

*first and second projections, each projection being formed by cutting a C-shaped slit in the metallic top plate and bending a tongue formed downwardly, each projection longitudinally extending along the depth D1, the first and second projections being formed at about the same distance from the first side and the second side, respectively; and*

*a second electrical connector including:*

*a body having a metallic top plate, a metallic bottom plate, a first side and a second side, the body having a width W2 and a depth D2, wherein the first and second sides are smaller relative to the top and bottom plates providing a substantially flat body;*

*an array of electrodes extending in the direction of the depth D2, the array of electrodes being positionally secured by insulating material to an interior surface of the body; and*

*first and second elongated slits formed on the metallic top plate of the body, the first and second elongated slits starting from a front edge of the metallic top plate and longitudinally extending in the direction of the depth D2, the first and second elongated slits being formed at about the same distance from the first side and the second side of the body, respectively,*

*wherein, the engagement projection and the elongated engagement slit are configured such that when inserting the second connector element into the first connector element, the engagement projection engages the elongated engagement slit to provide for straight alignment and to guide the sliding movement as the second connector element is pushed in the direction of depth and toward a rear of the first connector element.*

*5. The electrical connector system of claim 4 wherein the array of electrodes of the second electrical connector are positionally secured to the metallic bottom plate of the body, leaving an insertion cavity in the interior of the body of the second electrical connector between the array of electrodes and the metallic top plate.*

*6. The electrical connector system of claim 4 wherein the second electrical connector further comprises at least one raised springy holder that is raised upwardly from the top plate of the body of the second electrical connector, the raised springy holder providing for compressive action against the body of the first electrical connector when the first and second connectors mate.*

*7. The electrical connector system of claim 4 wherein each of the first and second elongated slits in the second*

*electrical connector has a length that is about two thirds of the depth D2 of the body of the second electrical connector.*

*8. The electrical connector system of claim 4 wherein each of the first and second projections in the first electrical connector has a length that is about two thirds of the depth D1 of the body of the first electrical connector.*

*9. The electrical connector system of claim 4 wherein the first elongated slit in the second electrical connector is formed adjacent to and at a predetermined distance form the first side of the second electrical connector, and the second elongated slit is formed adjacent to and at a predetermined distance from the second side of the second electrical connector, and wherein the outermost electrodes in the array of electrodes in the second electrical connector are formed between the first elongated slit and the second elongated slit.*

*10. The electrical connector system of claim 4 wherein the first projection in the first connector is formed adjacent to and at a predetermined distance form the first side of the first connector, and the second projection is formed adjacent to and at a predetermined distance from the second side of the first connector, and wherein the outermost electrodes in the array of electrodes in the first electrical connector are formed between the first projection and the second projection.*

* * * * *